US009759987B2

(12) United States Patent
Ikeda

(10) Patent No.: US 9,759,987 B2
(45) Date of Patent: Sep. 12, 2017

(54) STROBOSCOPIC DEVICE

(71) Applicant: PANASONIC INTELLECTUAL PROPERTY MANAGEMENT CO., LTD., Osaka (JP)

(72) Inventor: Takahiro Ikeda, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/109,800

(22) PCT Filed: Dec. 24, 2014

(86) PCT No.: PCT/JP2014/006419
§ 371 (c)(1),
(2) Date: Jul. 5, 2016

(87) PCT Pub. No.: WO2015/104775
PCT Pub. Date: Jul. 16, 2015

(65) Prior Publication Data
US 2016/0327848 A1    Nov. 10, 2016

(30) Foreign Application Priority Data
Jan. 7, 2014  (JP) ................................ 2014-000737

(51) Int. Cl.
*H05B 41/16* (2006.01)
*G03B 15/05* (2006.01)
(Continued)

(52) U.S. Cl.
CPC ............ *G03B 15/05* (2013.01); *H05B 41/32* (2013.01); *H05B 41/34* (2013.01)

(58) Field of Classification Search
CPC ........ G03B 15/05; G03B 15/03; H05B 41/32; H05B 41/34; H04N 5/238; H04N 5/225
(Continued)

(56) References Cited

U.S. PATENT DOCUMENTS 4,951,081 A * 8/1990 Hosomizu .............. G03B 15/05
                                                         396/164
5,075,714 A   12/1991 Hagiuda et al.
(Continued)

FOREIGN PATENT DOCUMENTS

JP          63129327 A   *  6/1988
JP        H02-158096 A     6/1990
(Continued)

OTHER PUBLICATIONS

International Search Report and Written Opinion issued in corresponding International Patent Application No. PCT/JP2014/006419, mailed on Mar. 31, 2015; with partial English abstract.

*Primary Examiner* — Daniel D Chang
(74) *Attorney, Agent, or Firm* — McDermott Will & Emery LLP

(57) ABSTRACT

A stroboscopic device includes a flash discharge tube, a first element for performing switching operation of flash discharge tube, a second element for performing ON control of the first element by an ON operation, and performing OFF control of the first element by an OFF operation, a third element for performing the OFF control of the first element by an ON operation, and performing the ON control of the first element by an OFF operation, and a first circuit for holding the ON operation of the third element for a predetermined period. The first circuit includes a fourth element for holding the ON control of the third element by the ON operation, and a second circuit capable of setting an operation period of an ON operation of the fourth element. This (Continued)

makes it possible to prevent false operation of the first element due to noise with a simple circuit configuration.

2 Claims, 6 Drawing Sheets

(51) Int. Cl.
  *H05B 41/34* (2006.01)
  *H05B 41/32* (2006.01)
(58) Field of Classification Search
  USPC .............. 315/224, 241 S; 396/156, 159, 205
  See application file for complete search history.

(56) References Cited

U.S. PATENT DOCUMENTS

| | | | |
|---|---|---|---|
| 5,752,102 A | 5/1998 | Matsui et al. | |
| 6,150,770 A | 11/2000 | Hirata et al. | |
| 6,556,790 B2 * | 4/2003 | Matsui | G03B 7/26 |
| | | | 396/156 |
| 2007/0145904 A1 | 6/2007 | Yoneya et al. | |

FOREIGN PATENT DOCUMENTS

| | | |
|---|---|---|
| JP | 2570109 Y2 | 5/1998 |
| JP | H11-242269 A | 9/1999 |
| JP | 2007-109551 A | 4/2007 |
| JP | 2011-232480 A | 11/2011 |

\* cited by examiner

STROBOSCOPIC DEVICE

RELATED APPLICATIONS

This application is the U.S. National Phase under 35 U.S.C. §371 of International Patent Application No. PCT/JP2014/006419, filed on Dec. 24, 2014, which in turn claims the benefit of Japanese Application No. 2014-000737, filed on Jan. 7, 2014, the disclosures of which Applications are incorporated by reference herein.

TECHNICAL FIELD

The present invention relates to a stroboscopic device used with an imaging device such as a digital camera or a mobile phone equipped with camera functions.

BACKGROUND ART

Conventionally, stroboscopic devices equipped with a flash discharge tube have been frequently used as a light source for emitting light to a photographic subject in taking photographs. Some of the stroboscopic devices are capable of selecting a flat light emission mode that causes the flash discharge tube to continue light emission for a predetermined period at an approximately constant luminance, or a normal light emission mode. In the above stroboscopic device, when, for example, the flat light emission mode is selected, a light emission control switching element such as an insulated gate bipolar transistor (hereinafter, abbreviated as IGBT) connected to the flash discharge tube in series is on-off controlled. This makes the flash discharge tube emit light at an approximately constant luminance in a pseudo manner for a predetermined period.

Hereinafter, operation of the stroboscopic device having the above configuration will be described with reference to FIGS. 6A and 6B.

FIG. 6A is a diagram illustrating a waveform of a light emission control signal input from an external signal input terminal of the stroboscopic device. FIG. 6B is a diagram illustrating a waveform of a driving voltage applied to the gate terminal of an IGBT in a conventional stroboscopic device.

Light emission control signal S as illustrated in FIG. 6A is typically input to a light emission control switching element of the stroboscopic device from the external signal input terminal of the stroboscopic device. This makes the light emission control switching element of the stroboscopic device perform ON/OFF operation to make the flash discharge tube perform light emission. Note that light emission control signal S is a control signal for applying a voltage that switches the light emission control switching element from an OFF state to an ON state. For example, when light emission control signal S is ON during time t1, the light emission control switching element holds the ON state during the period. Specifically, light emission control signal S is input from a control circuit for controlling the light emission amount of the flash discharge tube to the external signal input terminal.

Upon input of light emission control signal S from the control circuit, a driving voltage that increases at a predetermined voltage increase rate per a unit time is applied to the light emission control switching element as illustrated in FIG. 6B. Then, when the driving voltage applied to the light emission control switching element exceeds a predetermined threshold value voltage (for example, VGE), the light emission control switching element switches from an OFF state to an ON state, making a current flow in the flash discharge tube to start light emission.

At this time, a current flows in the flash discharge tube from a main capacitor via a current limiting coil. The current limiting coil is provided to slow the increase and decrease of the current flowing in the flash discharge tube (to lower change in light amount of light emission amount per a unit time).

That is, the current limiting coil slows the increase of the current flowing in the flash discharge tube when the light emission control switching element switches from the OFF state to the ON state. The light emission amount of the flash discharge tube also gently increases in response to the increase of the current.

The current limiting coil also slows the decreases of the current flowing in the flash discharge tube when the light emission control switching element switches from the ON state to the OFF state. The light emission amount of the flash discharge tube also slowly decreases in response to the decrease of the current. At this time, the light emission control switching element is switched to the OFF state, so that the current that has flowed in the flash discharge tube fails to flow via the light emission control switching element. Consequently, the current that has flowed in the flash discharge tube returns to the current limiting coil via a reflux diode connected in parallel with the flash discharge tube and the current limiting coil in the reverse direction.

At this time, noise generates in some cases when the light emission control switching element switches. Then, when the driving voltage applied to the light emission control switching element rises or drops more than or less than threshold value voltage VGE due to the generated noise, the ON/OFF state of the light emission control switching element is unintentionally switched in some cases. Furthermore, as illustrated in FIG. 6B, ON operation and OFF operation of the light emission control switching element is repeated due to noise in some cases. This unfortunately results in, for example, breakage of the light emission control switching element.

In order to solve the above problem, a stroboscopic device equipped with the configuration as described below is disclosed (for example, see PTL 1).

The stroboscopic device described in PTL 1 includes a light emission tube, an IGBT, a gate voltage generating circuit, and a gate voltage degenerating circuit, a timer, and an AND gate. The light emission tube corresponds to the above "flash discharge tube". The IGBT corresponds to the above "light emission control switching element" and is connected to the light emission tube in series to control light emission. The gate voltage generating circuit applies a voltage to the gage of the IGBT in response to a light emission start signal corresponding to above "light emission control signal S in ON state". The gate voltage degenerating circuit degenerates the gate voltage of the IGBT in response to a light emission stop signal corresponding to above "light emission control signal S in OFF state". The timer and the AND gate cancels the light emission stop signal during a predetermined period in response to the output of the light emission start signal. At this time, the timer outputs an output signal of "low (hereinafter, abbreviated as L)" level for a constant period in response to an input signal. Then, the AND gate outputs a result of the logical multiplication of the level of the output signal from the timer and the level of the light emission stop signal.

That is, in the above stroboscopic device, first, the gate voltage generating circuit applies a voltage to the gate of the IGBT in response to the input light emission start signal. At the same time, the light emission start signal is also input to the timer.

In this case, even when the light emission stop signal is input while the output signal from the timer is in "L" level, the output signal from the timer is input to the AND gate at "L" level. Consequently, the output signal from the AND gate is kept to "L" level regardless of input of the light emission stop signal. This allows the above stroboscopic device to cancel the light emission stop signal to be input till the output signal from the timer is switched to "high (hereinafter, abbreviated as H)" level. This makes it possible to keep light emission of the flash discharge tube while the output signal from the timer is in "L" level.

A stroboscopic device is also disclosed that includes a flash discharge tube, a flash discharge tube driving circuit using an IGBT, a timer circuit, and a flash discharge tube lighting control circuit (for example, see PTL 2). Note that, the timer circuit has a function for holding the conduction of the IGBT during a set period. The flash discharge tube lighting control circuit controls the conduction to the flash discharge tube by the logical sum of the output from the flash discharge tube driving circuit and the output from the timer circuit.

That is, the above stroboscopic device first divides the input signal corresponding to the above "light emission control signal S" to be input from an external signal input terminal into two signals, and input one of the divided input signals to the flash discharge tube driving circuit and input the other one of the divided input signals to the timer circuit.

Then, the timer circuit outputs a pulse (rectangular wave) having the length same as a pulse output from the flash discharge tube driving circuit in response to the input input signal.

Then, the output signals from the flash discharge tube driving circuit and the timer circuit are input to an OR (logical sum) gate. Then, a result of the logical sum is input to the IGBT.

Note that the flash discharge tube driving circuit of the above stroboscopic device is readily affected by noise as compared with the timer circuit. This is because, as illustrated in FIG. 6B, the rise time of the driving signal is slow in the flash discharge tube driving circuit, so that the noise generated at switching of the IGBT is readily superimposed, whereas the output from the timer circuit has a short rise time, so that noise is not easily superimposed. In view of such characteristics, the output signal of the timer circuit is switched to "H" level. This makes it possible to apply voltage to the gate of the IGBT regardless of the output signal from the flash discharge tube driving circuit affected by noise, allowing the flash discharge tube to keep light emission while the timer circuit is in "H" level.

However, the stroboscopic device described in PTL 1 needs an extra circuit configuration such as a timer and an AND gate to cancel the light emission stop signal affected by noise. Likewise, the stroboscopic device described in PTL 2 unfortunately needs an extra circuit configuration such as a timer circuit and an OR (logical sum) gate to cancel the output signal from the flash discharge tube driving circuit affected by noise.

CITATION LIST

Patent Literature

PTL 1: Japanese Utility Model Registration No. 2570109

PTL 2: Unexamined Japanese Patent Publication No. 2007-109551

SUMMARY OF THE INVENTION

The present invention provides a stroboscopic device that prevents false operation of a light emission control switching element due to noise with a simple circuit configuration.

That is, the present invention provides a stroboscopic device for controlling light emission of a flash discharge tube. The stroboscopic device includes a first element for performing a switching operation of the flash discharge tube, a second element for performing an ON control of the first element by an ON operation, and performing an OFF control of the first element by an OFF operation, a third element for performing the OFF control of the first element by an ON operation, and performing the ON control of the first element by an OFF operation, and a first circuit for holding the ON operation of the third element for a predetermined period. The first circuit includes a fourth element for holding the ON control of the third element by the ON operation, and a second circuit capable of setting an operation period of an ON operation of the fourth element.

According to the configuration, the first element is made to perform the OFF operation by the OFF control of the second element. At this time, against the signal that makes the first element perform the ON operation generated due to noise caused by the OFF operation of the first element, the third element is made to hold the ON operation by the fourth element during the operation period set by the second circuit. Then, the first element is OFF controlled by the ON operation of the third element. Keeping the OFF control of the first element in this manner makes it possible to prevent false operation of the first element. This eliminates the need of a timer circuit and a logic circuit such as an AND gate or an OR gate, which are conventionally needed, as circuits for preventing false operation of the first element. That is, the first circuit can be formed by a simple circuit configuration formed of an ON operation hold transistor and a delay circuit.

DESCRIPTION OF EMBODIMENT

Hereinafter, a stroboscopic device according to an exemplary embodiment of the present invention will be described with reference to the drawings. Note that the exemplary embodiment does not limit the present invention.

Exemplary Embodiment

A circuit configuration of the stroboscopic device according to the exemplary embodiment will be described with reference to FIG. 1.

Figure 1:
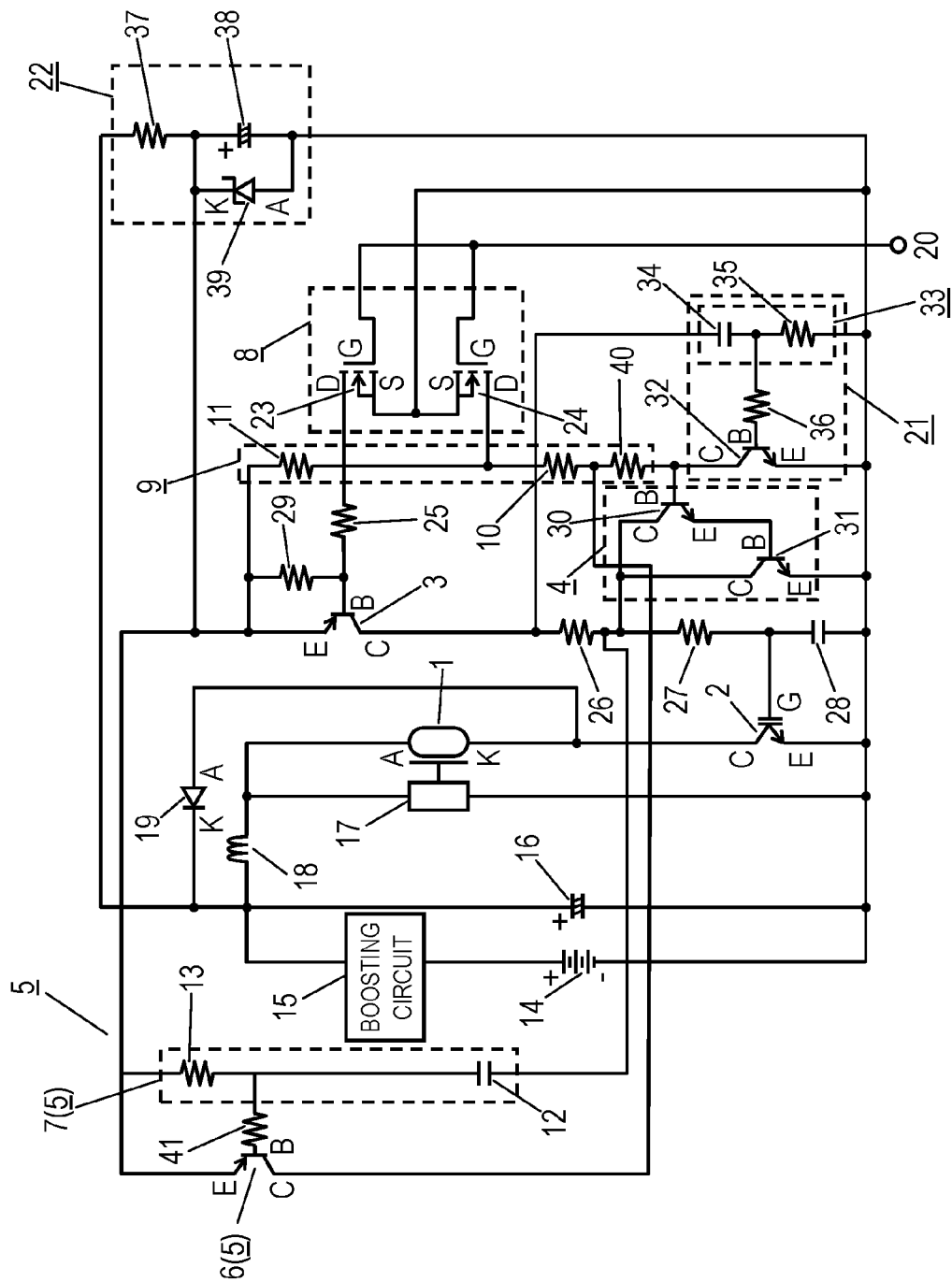
FIG. 1 is a block diagram illustrating a circuit configuration of a stroboscopic device according to an exemplary embodiment of the present invention.

FIG. 1 is a block diagram illustrating the circuit configuration of the stroboscopic device according to the exemplary embodiment of the present invention.

As illustrated in FIG. 1, the stroboscopic device according to the exemplary embodiment includes at least flash discharge tube 1, first element 2, second element 3, third element 4, first circuit 5, etc. First element 2 performs switching operation for controlling light emission of flash discharge tube 1. Second element 3 performs ON control of first element 2 by ON operation, and performs OFF control of first element 2 by OFF operation. Third element 4 performs OFF control of first element 2 by ON operation, and performs ON control of first element 2 by OFF operation. First circuit 5 is configured to hold ON operation of third element 4 for a predetermined period.

First circuit 5 includes fourth element 6 and second circuit 7. The fourth element holds ON control of third element 4 by ON operation. Second circuit 7 sets the operating period of ON operation of fourth element 6.

The stroboscopic device of the exemplary embodiment further includes third circuit 8 that causes third element 4 to perform ON operation on the basis of light emission control signal S that makes flash discharge tube 1 stop light emission. First circuit 5 further includes fourth circuit 9 that causes third element 4 to perform ON operation by fourth element 6 regardless of operation of third element 4 by third circuit 8.

Fourth circuit 9 has first resistor 10 and second resistor 11. First resistor 10 is connected between third circuit 8 and third element 4. Second resistor 11 is connected between third circuit 8 and second circuit 7.

Second circuit 7 has first storage element 12 and third resistor 13 that are branched from the circuit connecting second element 3 and fourth element 6 and connected in series. Fourth element 6 performs switching operation by a differential voltage between first storage element 12 and third resistor 13. This makes fourth element 6 hold ON operation of third element 4.

The circuit of the stroboscopic device according to the exemplary embodiment is configured as described above.

Next, the circuit configuration of the stroboscopic device according to the exemplary embodiment will be further described in detail.

The stroboscopic device of the exemplary embodiment is formed of at least power source battery 14, fifth circuit 15 (hereinafter, referred to as "boosting circuit 15"), second storage element 16 (hereinafter, referred to as "main capacitor 16"), flash discharge tube 1, first element 2, sixth circuit 17 (hereinafter, referred to as "trigger circuit 17"), current limiting coil 18, reflux diode 19, third circuit 8, second element 3, third element 4, seventh circuit 21, eighth circuit 22, first circuit 5, etc. Boosting circuit 15 boosts power source voltage from power source battery 14 to direct current high voltage. Main capacitor 16 accumulates charge (is charged) by the direct current high voltage boosted by boosting circuit 15. Flash discharge tube 1 is formed of, for example, a xenon tube, and consumes the charge accumulated in main capacitor 16 for light emission. First element 2 performs switching operation depending on the light emission intensity of flash discharge tube 1. Trigger circuit 17 excites gas or the like enclosed in flash discharge tube 1. Current limiting coil 18 limits rapid change in current for light emission to be supplied to flash discharge tube 1 from main capacitor 16. Reflux diode 19 returns induced current generated in current limiting coil 18 to current limiting coil 18. Third circuit 8 amplifies light emission control signal S to be input from external signal input terminal 20. Second element 3 performs ON control of first element 2. Third element 4 performs OFF control of first element 2. Seventh circuit 21 cutoffs OFF operation of first element 2 by third element 4 for a predetermined period. Eighth circuit 22 steps down the voltage boosted by boosting circuit 15 to power source voltage for driving the gate of first element 2 for supply. First circuit 5 holds ON operation of third element 4 for a predetermined period.

First element 2 is formed of, for example, an insulated-gate bipolar transistor (IGBT) (hereinafter, referred to as "IGBT 2"). IGBT 2 forms a circuit formed of main capacitor 16, current limiting coil 18, and flash discharge tube 1 in the ON state and causes flash discharge tube 1 to emit light.

Current limiting coil 18 is connected to main capacitor 16 and flash discharge tube 1 in series. Current limiting coil 18 functions as a coil element for slowing change of increase and decrease in current for light emission from main capacitor 16 to flash discharge tube 1.

Reflux diode 19 is inversely connected to current limiting coil 18 and flash discharge tube 1 in parallel. Anode (A) terminal of reflux diode 19 is connected between cathode (K) terminal of flash discharge tube 1 and collector terminal (C) of IGBT 2. Cathode (K) terminal of reflux diode 19 is connected to positive electrode (+) of main capacitor 16.

Third circuit 8 forms a signal amplification circuit (hereinafter, referred to as "signal amplification circuit 8"). Signal amplification circuit 8 is formed of, for example, first metal oxide semiconductor-field effect transistor (MOS-FET) 23 and second MOS-FET 24 of enhancement-mode. Source (S) terminals of first MOS-FET 23 and second MOS-FET 24 are connected to each other, and are connected to negative electrode (−) of eighth circuit 22. Source (S) terminals of first MOS-FET 23 and second MOS-FET 24 are set to GND level. Gate (G) terminals of first MOS-FET 23 and second MOS-FET 24 are connected to external signal input terminal 20. Note that, in the exemplary embodiment, each of first MOS-FET 23 and second MOS-FET 24 is formed of, for example, an n-MOS-FET.

Second element 3 is formed of, for example, a PNP junction type transistor, and forms an ON control transistor for controlling ON operation of first element 2 (hereinafter, referred to as "ON control transistor 3"). Base (B) terminal of ON control transistor 3 is connected to drain (D) terminal of first MOS-FET 23 via fourth resistor 25. Emitter (E) terminal of ON control transistor 3 is connected to positive electrode (+) of eighth circuit 22. Collector (C) terminal of ON control transistor 3 is connected to gate (G) terminal of IGBT 2 via fifth resistor 26 and sixth resistor 27. Furthermore, collector (C) terminal of ON control transistor 3 is connected to negative electrode (−) of eighth circuit 22 via third storage element 28 (capacitor 28). This sets collector (C) terminal of ON control transistor 3 to GND level. Seventh resistor 29 is connected between emitter (E) and base (B) of ON control transistor 3.

Third element 4 forms an OFF control switching element for controlling OFF operation of first element 2 (hereinafter, referred to as "OFF control switching element 4"). OFF control switching element 4 is formed of a circuit in which two, for example, NPN junction type transistors 30, 31 are Darlington-connected. Note that, hereinafter, transistor 30 is referred to as "pre-stage OFF control transistor 30", and transistor 31 is referred to as "post-stage OFF control transistor 31" for description.

Base (B) terminal of pre-stage OFF control transistor 30 is connected to drain (D) terminal of second MOS-FET 24. Emitter (E) terminal of pre-stage OFF control transistor 30 is connected to base (B) terminal of post-stage OFF control transistor 31. Collector (C) terminals of pre-stage OFF control transistor 30 and post-stage OFF control transistor 31 are branched from a connecting point between fifth resistor 26 connected to the side of collector (C) terminal of ON control transistor 3 and sixth resistor 27 connected to the side of gate (G) of IGBT 2 and connected. Emitter (E) terminal of post-stage OFF control transistor 31 is connected to negative electrode (−) of eighth circuit 22. This sets emitter (E) terminal of post-stage OFF control transistor 31 to GND level. Fifth resistor 26 is connected between ON control transistor 3 and collector (C) terminals of pre-stage OFF control transistor 30 and post-stage OFF control transistor 31. Sixth resistor 27 is connected between collector (C) terminals of pre-stage OFF control transistor 30 and post-stage OFF control transistor 31 and gate (G) terminal of IGBT 2.

Seventh circuit 21 forms an OFF operation cutoff control circuit (hereinafter, referred to as "OFF operation cutoff control circuit 21"). OFF operation cutoff control circuit 21 has OFF operation cutoff transistor 32 (OFF operation cutoff switching element) and differential circuit 33. OFF operation cutoff transistor 32 cutoffs OFF operation of IGBT 2 performed by OFF control switching element 4. Differential circuit 33 sets operation period of OFF operation cutoff transistor 32.

That is, OFF operation cutoff transistor 32 performs switching operation by the differential voltage output from differential circuit 33, and cutoffs the operation of OFF control switching element 4. Specifically, collector (C) terminal of OFF operation cutoff transistor 32 is connected to base (B) terminal of pre-stage OFF control transistor 30. Then, emitter (E) terminal of OFF operation cutoff transistor 32 is connected to negative electrode (−) of eighth circuit 22. This sets emitter (E) terminal of OFF operation cutoff transistor 32 to GND level. Consequently, when a signal is input to base (B) terminal of OFF operation cutoff transistor 32 to switch OFF operation cutoff transistor 32 to an ON state, pre-stage OFF control transistor 30 is set to GND level. This cutoffs light emission control signal S (on signal) from second MOS-FET 24.

Differential circuit 33 of OFF operation cutoff control circuit 21 is formed of third storage element 34 (hereinafter, referred to as "differential capacitor 34"), and eighth resistor 35 (hereinafter, referred to as "differential resistor 35"). Differential capacitor 34 and differential resistor 35 are branched from the circuit for causing IGBT 2 to perform switching operation and connected in series. 10 Differential circuit 33 causes OFF operation cutoff transistor 32 to perform switching operation by the differential voltage generated across both terminals of differential resistor 35. At this time, the time constant determined by differential capacitor 34 and differential resistor 35 is set during the period from when OFF operation cutoff transistor 32 is switched to the ON state to generate 15 noise to when the generated noise decays. Ninth resistor 36 is branched from a connecting point between differential capacitor 34 and differential resistor 35, and is connected to base (B) terminal of OFF operation cutoff transistor 32.

Eighth circuit 22 forms a gate power source circuit (hereinafter, referred to as "gate power source circuit 22"). In gate power source circuit 22, fourth storage element 38 (hereinafter, referred to as "gate drive capacitor 38") and Zener diode 39 are connected in parallel via boosting circuit 15 and tenth resistor 37. The positive electrode (+) side of gate drive capacitor 38 is connected gate (G) terminal of IGBT 2 via ON control transistor 3, fifth resistor 26, and sixth resistor 27. This makes gate power source circuit 22 become power source for driving gate (G) of IGBT 2. The negative electrode (−) side of gate drive capacitor 38 is set to GND level. Zener diode 39 is connected in a reverse bias state to the gate drive capacitor 38 to set the gate voltage of IGBT 2.

First circuit 5 forms an ON operation hold control circuit for OFF control switching element 4 of IGBT 2 that is first element 2 (hereinafter, referred to as "ON operation hold control circuit 5"). ON operation hold control circuit 5 has fourth element 6 (hereinafter, referred to as "ON operation hold transistor 6"), and second circuit 7 (hereinafter, referred to as "delay circuit 7"). ON operation hold transistor 6 holds ON operation of OFF control switching element 4. Delay circuit 7 sets operation period of ON operation of ON operation hold transistor 6.

ON operation hold control circuit 5 has fourth circuit 9 that prioritizes ON operation of OFF control switching element 4 by ON operation hold transistor 6 over ON operation of OFF control switching element 4 by signal amplification circuit 8. Note that, in the exemplary embodiment, delay circuit 7 is formed of, for example, a differential circuit.

Fourth circuit 9 has first resistor 10 connected between signal amplification circuit 8 and OFF control switching element 4, and second resistor 11 connected between signal amplification circuit 8 and delay circuit 7. Fourth circuit 9 further has eleventh resistor 40 connected between first resistor 10 and base (B) of pre-stage OFF control transistor 30.

ON operation hold transistor 6 performs switching operation by the differential voltage output from delay circuit 7 to hold the operation of OFF control switching element 4. Specifically, collector (C) terminal of ON operation hold transistor 6 is connected between first resistor 10 and eleventh resistor 40. Emitter (E) terminal of ON operation hold transistor 6 is connected to positive electrode (+) of gate power source circuit 22. Consequently, when a signal is input to base (B) terminal of ON operation hold transistor 6 and ON operation hold transistor 6 is switched to the ON state, an on signal is transmitted to pre-stage OFF control transistor 30, turning on pre-stage OFF control transistor 30.

Delay circuit 7 is formed of first storage element 12 (hereinafter, referred to as "delay capacitor 12"), and third resistor 13 (hereinafter, referred to as "delay resistor 13"). Delay capacitor 12 and delay resistor 13 are branched from a circuit connecting second resistor 11 and ON operation hold transistor (fourth element) 6 and connected in series. ON operation hold transistor 6 performs switching operation by the differential voltage between delay capacitor 12 and delay resistor 13 to hold ON operation of OFF control switching element 4. At this time, the time constant determined by delay capacitor 12 and delay resistor 13 is set during the period from when OFF control switching element 4 is switched to the ON state to generate noise to when the generated noise decays. Twelfth resistor 41 is branched from a connecting point between delay capacitor 12 and delay resistor 13 and is connected to base (B) terminal of ON operation hold transistor 6.

Operations of the stroboscopic device configured as described above will be described with reference to FIGS. 2A to 3C in addition to FIG. 1.

Figure 2A:
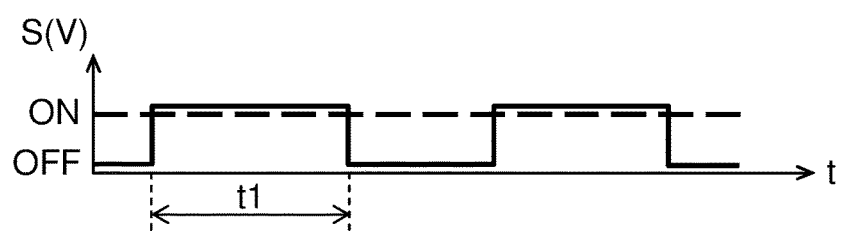
FIG. 2A is a diagram illustrating an input voltage waveform of light emission control signal S input from an external signal input terminal of the stroboscopic device according to the exemplary embodiment.
Figure 2B:
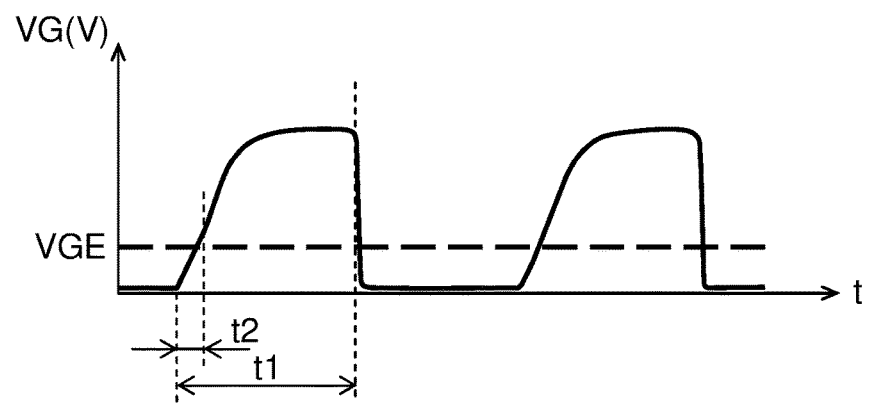
FIG. 2B is a diagram illustrating a waveform of driving voltage VG applied to the gate terminal of an IGBT of the stroboscopic device according to the exemplary embodiment.
Figure 3A:
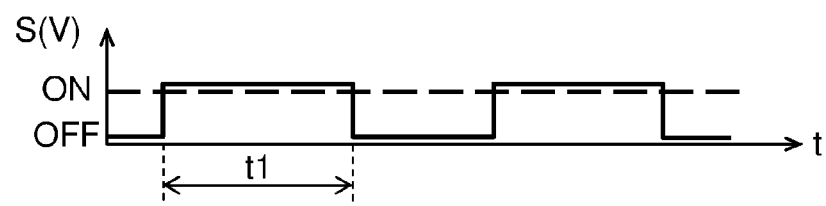
FIG. 3A is a diagram illustrating an input voltage waveform of light emission control signal S input from the external signal input terminal of the stroboscopic device according to the exemplary embodiment.
Figure 3B:
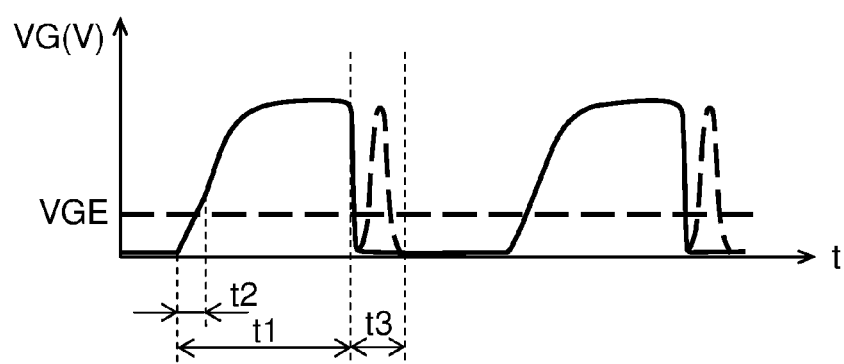
FIG. 3B is a diagram illustrating a waveform of gate voltage VG applied to the gate terminal of the IGBT in a state where noise is mixed to light emission control signal S in the stroboscopic device according to the exemplary embodiment.
Figure 3C:
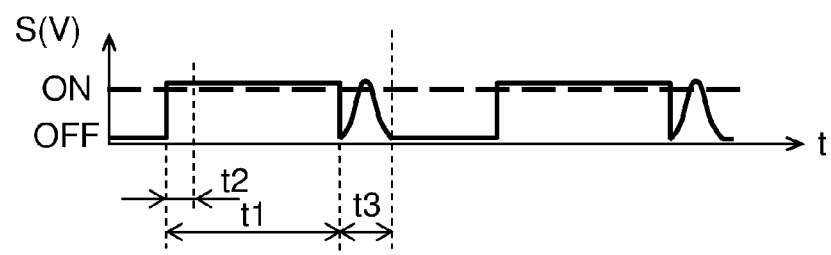
FIG. 3C is a diagram illustrating a waveform of light emission control signal S in a state where noise is mixed in the stroboscopic device according to the exemplary embodiment.

FIG. 2A is a diagram illustrating an input voltage waveform of light emission control signal S input from the external signal input terminal of the stroboscopic device according to the exemplary embodiment. FIG. 2B is a diagram illustrating a waveform of driving voltage VG applied to the gate terminal of the IGBT of the stroboscopic device according to the exemplary embodiment. FIG. 3A is a diagram illustrating an input voltage waveform of light emission control signal S input from the external signal input terminal of the stroboscopic device according to the exemplary embodiment. FIG. 3B is a diagram illustrating a waveform of gate voltage VG applied to the gate terminal of IGBT in the state where noise is mixed to light emission control signal S in the stroboscopic device according to the exemplary embodiment. FIG. 3C is a diagram illustrating an input voltage waveform of light emission control signal S in the state where noise is mixed in the stroboscopic device according to the exemplary embodiment.

First, light emission control signal S having, for example, ON operation time t1 as illustrated in FIG. 2A is input to external signal input terminal 20 illustrated in FIG. 1. Then, when light emission control signal S is switched from an OFF state to an ON state, a voltage is applied to the gate terminals of first MOS-FET 23 and second MOS-FET 24 of signal amplification circuit 8. This makes first MOS-FET 23 and second MOS-FET 24 switch to an ON state. Switching first MOS-FET 23 to the ON state switches ON control transistor 3 to an ON state, making a current flow between emitter (E) and collector (C) of ON control transistor 3.

Furthermore, when ON control transistor 3 becomes the ON state, a voltage is applied to the gate terminal of IGBT 2 and a voltage is applied also to differential circuit 33 of seventh circuit 21. At this time, the voltage applied to differential circuit 33 is differentiated by the time constant determined by differential capacitor 34 and differential resistor 35 to be output to base (B) terminal of OFF operation cutoff transistor 32. This applies the voltage to base (B) terminal of OFF operation cutoff transistor 32 till the time corresponding to the time constant passes. During the period, base (B) terminal of pre-stage OFF control transistor 30 of third element 4 is set to GND level.

Next, when the voltage is applied to the gate terminal of IGBT 2, gate voltage VG increases as illustrated in FIG. 2B. Then, when gate voltage VG reaches threshold value voltage VGE after, for example, time t2, IGBT 2 becomes an ON state, increasing the current flowing in flash discharge tube 1.

At this time, as described above, when IGBT 2 is switched from the OFF state to the ON state, some of the current flowing from main capacitor 16 flows in reflux diode 19 in a reverse bias state. Thus, noise generates in some cases when IGBT 2 switches from the OFF state to the ON state. The voltage of light emission control signal S decreases in some cases due to the generated noise. This temporarily lowers the voltage of light emission control signal S to invert the states of first MOS-FET 23 and second MOS-FET 24, switching ON control transistor 3 to the OFF state.

In contrast, in pre-stage OFF control transistor 30 of third element 4, the gate terminal is set to GND level till the time corresponding to the time constant of differential circuit 30 passes. Consequently, pre-stage OFF control transistor 30 is not switched to the ON state even when second MOS-FET 24 is switched to the OFF state. That is, OFF control switching element 4 is not switched to the OFF state, so that IGBT 2 self holds the ON state by its gate capacity, resulting in no lowering of gate voltage VG of IGBT 2.

Then, light emission control signal S recovers as noise decays. Then, when the time corresponding to the time constant of differential circuit 33 passes, a driving voltage is applied to the gate terminal of IGBT 2 again. At this time, the applied driving voltage keeps a voltage higher than threshold value voltage VGE. Consequently, driving voltage VG of IGBT 2 is capable of continuing to increase while IGBT 2 keeps the ON state.

Then, when light emission control signal S is switched from an ON state to an OFF state after time t1, first MOS-FET 23 and second MOS-FET 24 of signal amplification circuit 8 are switched to the OFF state. When first MOS-FET 23 is switched to the OFF state, ON control transistor 3 is switched to the OFF state, cutting off the current flowing between emitter (E) and collector (C) of ON control transistor 3.

Then, when second MOS-FET 24 is switched to the OFF state, a voltage is applied to the gate terminal of pre-stage OFF control transistor 30 to switch pre-stage OFF control transistor 30 to the ON state. This switches IGBT 2 to the OFF state.

At this time, as described above, noise generates in some cases when IGBT 2 is switched from the ON state to the OFF state. Consequently, as illustrated in FIG. 3C, the voltage of light emission control signal S increases in some cases during time t3 after switching operation (switch to OFF state) of second MOS-FET 24 due to the generated noise. Then, when the voltage of light emission control signal S temporarily increases, the states of first MOS-FET 23 and second MOS-FET 24 are inverted, making ON control transistor 3 try to switch to the ON state. At this time, when ON control transistor 3 is switched to the ON state, the charge of gate drive capacitor 38 flows between the emitter and collector of ON control transistor 3.

To prevent the above inversion operation due to noise, the exemplary embodiment makes signal amplification circuit 8 be in the OFF state to make ON control transistor 3 be in the OFF state. This supplies the charge of gate drive capacitor 38 to differential circuit 7 (delay circuit 7). The charge of gate drive capacitor 38 is then supplied to the emitter of ON operation hold transistor 6. This applies a voltage to base (B) terminal of ON operation hold transistor 6 only during the time constant determined by delay capacitor 12 and delay resistor 13 of delay circuit 7 that is a differential circuit (for example, time t3 illustrated in FIG. 3C), turning on ON operation hold transistor 6.

Then, when ON operation hold transistor 6 turns on, the charge of gate drive capacitor 38 flows between the emitter and collector of ON operation hold transistor 6. This applies a voltage between first resistor 10 and the gate terminal of pre-stage OFF control transistor 30.

That is, when second MOS-FET 24 is in the ON state due to noise, the charge flowing via ON operation hold transistor 6 is not drawn to the drain terminal of second MOS-FET 24 by first resistor 10, applying a voltage to base (B) terminal of pre-stage OFF control transistor 30.

This makes pre-stage OFF control transistor 30 keep the ON state and also makes the post-stage OFF control transistor 31 keep the ON state. Making the post-stage OFF control transistor 31 keep the ON state allows a current to flow between the collector and emitter, setting the gate terminal of IGBT 2 to GND level. AT this time, the charge accumulated in the gate capacitance of IGBT 2 is consumed, so that IGBT 2 keeps the OFF state, resulting in decrease of the current flowing in flash discharge tube 1.

Then, when noise decreases, OFF operations of first MOS-FET 23 and second MOS-FET 24 keep ON operation of OFF control switching element 4. This prevents application of a driving voltage exceeding threshold value voltage VGE as illustrated by dotted lines in FIG. 3B to the gate terminal of IGBT 2 to keep IGBT 2 in the OFF state.

That is, in the exemplary embodiment, the signal from delay circuit 7 formed of the differential circuit turns on OFF control switching element 4. This prevents OFF operation of OFF control switching element 4 that is affected by the OFF operation of second MOS-FET 24 due to noise, making it possible to prevent false operation such as ON operation of IGBT 2 due to noise.

As described above, according to the exemplary embodiment, ON control of ON control transistor 3 makes IGBT 2 perform switching operation. At this time, ON control transistor 3 cutoffs ON operation of OFF control switching element 4 by OFF operation cutoff transistor 32 during OFF operation period set by differential circuit 33. This makes it possible to prevent false operation of IGBT 2 even when noise due to switching operation of IGBT 2 makes OFF control switching element 4 perform ON operation.

This eliminates the need of a timer circuit and a logic circuit such as an AND gate or an OR gate that are needed in a conventional stroboscopic device as circuits for preventing false operation of IGBT 2. That is, OFF operation cutoff control circuit 21 can be formed by a simple circuit configuration formed of OFF operation cutoff transistor 32 and differential circuit 33.

Furthermore, according to the exemplary embodiment, light emission control signal S, which is branched from the circuit for making ON control transistor 3 perform switching operation, is differentiated by differential circuit 33. Then, OFF operation cutoff transistor 32 is made to perform switching operation during operation period determined by the time constant determined by the differential capacitor 34 and the differential resistor 35 after light emission control signal S is switched from the OFF state to the ON state. At this time, noise generates due to switching operation of IGBT 2 from the OFF state to the ON state. To cope with noise, OFF operation cutoff transistor 32 is made to perform switching operation during noise generation to cutoff switching operation of OFF control switching element 4. This makes it possible to prevent false operation of IGBT 2 due to noise during operation period of OFF operation cutoff transistor 32.

Furthermore, according to the exemplary embodiment, OFF control of ON control transistor 3 makes IGBT 2 perform switching operation. At this time, ON operation hold control circuit 5 holds ON operation of OFF control switching element 4 by ON operation hold transistor 6 during ON operation period set by delay circuit 7 formed of the differential circuit. This makes it possible to prevent OFF operation of OFF control switching element 4 due to inversion of light emission control signal S caused by noise due to switching operation of IGBT 2. This makes it possible to prevent false operation of IGBT 2 due to OFF operation of ON control transistor 3.

That is, the above configuration eliminates the need of a timer circuit and a logic circuit such as an AND gate or an OR gate that are needed in a conventional stroboscopic device as circuits for preventing false operation of IGBT 2. This makes it possible to form ON operation hold control circuit 5 with the simple circuit configuration formed of ON operation hold transistor 6 and delay circuit 7.

Note that the stroboscopic device according to the present invention is not limited to the above exemplary embodiment, and can be modified in any manner within a range not departing from the concept of the present invention.

For example, in the above exemplary embodiment, the example is described by the configuration equipped with OFF operation cutoff control circuit 21 for cutting off OFF operation of OFF control switching element 4 to prevent false operation of IGBT 2 due to noise, but this is not limited thereto. For example, a configuration of a stroboscopic device according to an alternative example to be described below with reference to FIGS. 4 to 5C may be employed.

Figure 4:
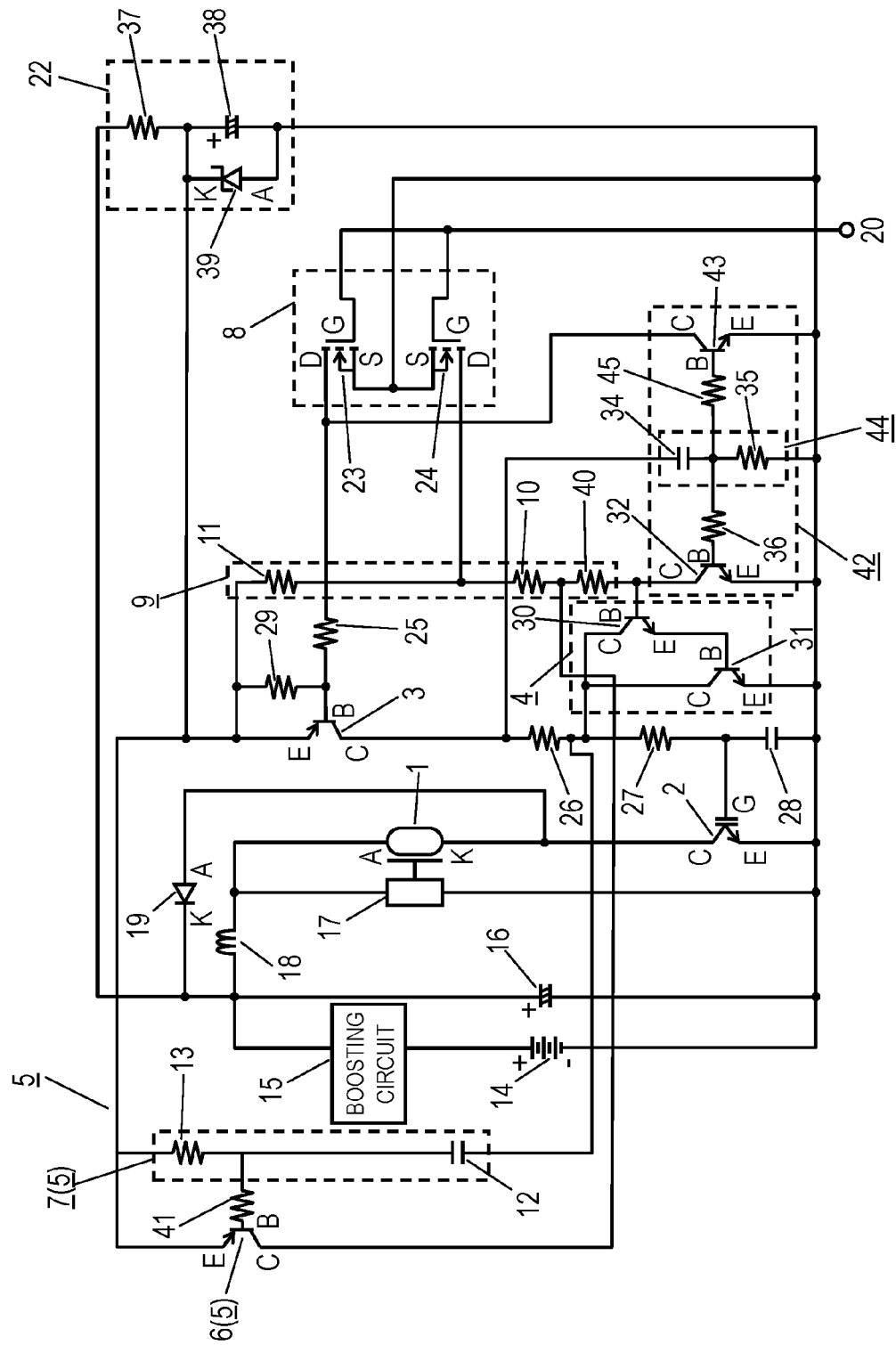
FIG. 4 is a block diagram illustrating a circuit configuration of a stroboscopic device according to an alternative example of the exemplary embodiment.
Figure 5A:
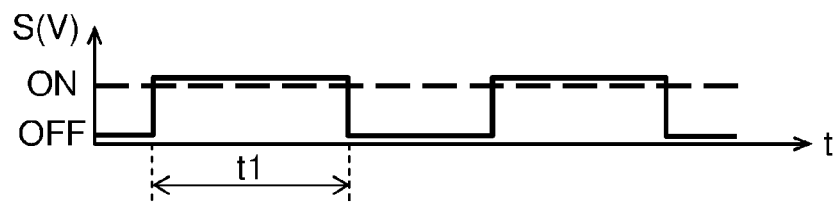
FIG. 5A is a diagram illustrating a waveform of a light emission control signal input from an external signal input terminal of the stroboscopic device according to the alternative example of the exemplary embodiment.
Figure 5B:
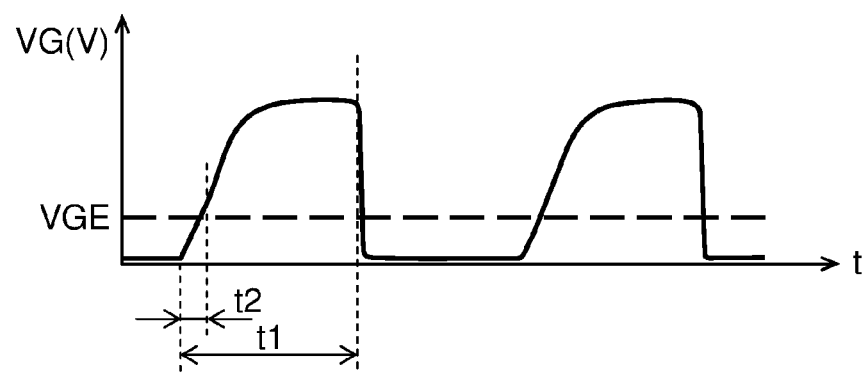
FIG. 5B is a diagram illustrating a waveform of a driving voltage applied to the gate terminal of an IGBT of the stroboscopic device according to the alternative example of the exemplary embodiment.
Figure 5C:
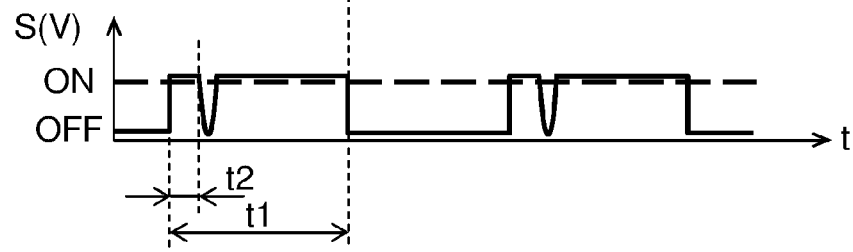
FIG. 5C is a diagram illustrating a waveform of a light emission control signal in a case where noise is mixed to the light emission control signal in the stroboscopic device according to the alternative example of the exemplary embodiment.
Figure 6A:
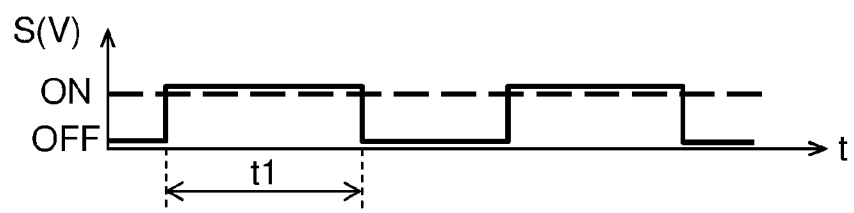
FIG. 6A is a diagram illustrating a waveform of a light emission control signal input from an external signal input terminal of the stroboscopic device.
Figure 6B:
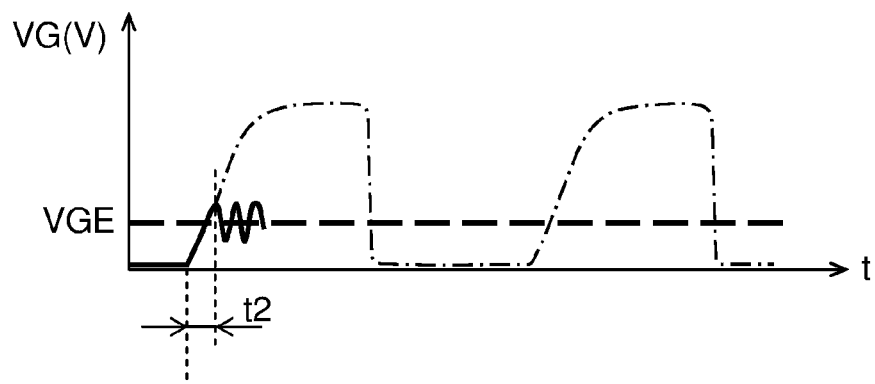
FIG. 6B is a diagram illustrating a waveform of a driving voltage applied to the gate terminal of an IGBT in a conventional stroboscopic device.

FIG. 4 is a block diagram illustrating a circuit configuration of a stroboscopic device according to an alternative example of the exemplary embodiment. FIG. 5A is a diagram illustrating a waveform of a light emission control signal input from an external signal input terminal of the stroboscopic device according to the exemplary embodiment. FIG. 5B is a diagram illustrating a waveform of gate voltage VG applied to the gate terminal of an IGBT of the stroboscopic device according to the alternative example of the exemplary embodiment. FIG. 5C is a diagram illustrating a waveform of light emission control signal S in a state where noise is mixed to the light emission control signal of the stroboscopic device according to the alternative example of the exemplary embodiment.

First, as illustrated in FIG. 4, the stroboscopic device according to the alternative example is different from the above exemplary embodiment at the point of including switching operation control circuit 42 instead of OFF operation cutoff control circuit 21. In this case, switching operation control circuit 42 has the functions of cutting off OFF operation of IGBT 2 by OFF control switching element 4 for a predetermined period and holding ON operation of IGBT 2 by ON control transistor 3 for a predetermined period.

That is, switching operation control circuit 42 has at least OFF operation cutoff transistor 32 (OFF operation cutoff switching element), ON operation hold transistor 43 (ON control switching element), differential circuit 44, resistor 45, etc. ON operation hold transistor 43 holds ON operation of IGBT 2. Differential circuit 44 sets operation period of OFF operation cutoff transistor 32 and ON operation hold transistor 6. Resistor 45 is branched from a connecting point between differential capacitor 34 and differential resistor 35 and is connected to base (B) terminal of ON operation hold transistor 43.

On operation hold transistor 43 performs switching operation by the differential voltage output from differential circuit 44, and holds operation of ON control transistor 3. Specifically, collector (C) terminal of ON operation hold transistor 43 is connected to base (B) terminal of ON control transistor 3 via drain (D) terminal of first MOS-FET 23 of signal amplification circuit 8 and resistor 25. Emitter (E) terminal of ON operation hold transistor 43 is set to GND level by being connected to negative electrode (−) of gate power source circuit 22. That is, when a signal is input to base (B) terminal of ON operation hold transistor 43 and ON operation hold transistor 43 is switched to the ON state, base (B) terminal of ON control transistor 3 is set to GND level. This allows light emission control signal S to be held at GND level via first MOS-FET 23. At this time, IGBT 2 holds ON operation regardless of generation of noise. Consequently, as illustrated in FIG. 5B, gate voltage VG of IGBT 2 increases, resulting in an ideal waveform.

As described above, IGBT 2 holds ON operation by ON operation hold transistor 43 during an operation period set by the time constant of differential circuit 44. This makes it possible to prevent false operation of IGBT 2 even when noise due to switching operation of IGBT 2 makes ON control transistor 3 perform OFF operation.

This eliminates the need of a timer circuit and a logic circuit such as an AND gate or an OR gate that are needed in a conventional stroboscopic device as circuits for preventing false operation of IGBT 2. That is, switching operation control circuit 42 can be formed by a simple circuit structure formed of OFF operation cutoff transistor 32, ON operation hold transistor 43, and differential circuit 44.

Furthermore, light emission control signal S, which is branched from the circuit for making ON control transistor 3 perform switching operation, is differentiated by differential circuit 44. Then, ON operation hold transistor 43 is made to perform switching operation during operation period determined by the time constant determined by differential capacitor 34 and differential resistor 35 after light emission control signal S is switched from the OFF state to the ON state. At this time, noise generates during the OFF state of IGBT 2 due to switching operation of IGBT 2 from the OFF state to the ON state. To cope with noise, ON operation hold transistor 43 is made to perform switching operation during noise generation to hold switching operation of ON control transistor 3. This makes it possible to prevent false operation of IGBT 2 due to noise during operation period of ON operation hold transistor 43.

Furthermore, in the above exemplary embodiment, the stroboscopic device having OFF operation cutoff control circuit 21 illustrated in FIG. 1 is described as an example, but this is not limited thereto. For example, the stroboscopic device may include an ON hold control circuit for holding ON operation of IGBT 2 by ON control transistor 3 for a predetermined period. Note that the ON hold control circuit is formed of ON control transistor 43 (ON control switching element), differential circuit 44, etc. like the stroboscopic device according to the alternative example illustrated in FIG. 4. This makes it possible to prevent false operation of IGBT 2 for a predetermined period set by the ON hold control circuit regardless of generation of noise.

Furthermore, in the above exemplary embodiment, the example is described in which differential capacitor 34 and differential resistor 35 have fixed values, but this is not limited thereto. For example, differential capacitor 34 and differential resistor 35 capable of changing their values may be used. This makes it possible to change the time constant as appropriate depending on the circumstance of noise to be generated by switching operation to prevent false operation of IGBT 2 more surely.

Furthermore, in the above exemplary embodiment, the example is described in which two transistors, which are pre-stage OFF control transistor 30 and post-stage OFF control transistor 31, are Darlington-connected to use as OFF control switching element 4, but this is not limited thereto. For example, OFF control switching element 4 may be formed of one MOS-FET. This allows simplification of the configuration and reduction of the cost.

Furthermore, in the above exemplary embodiment, the example is described in which delay circuit 7 is formed of a differential circuit, but this is not limited thereto. For example, the delay circuit 7 may be formed of an integration circuit. This makes it possible to increase degree of freedom in design and versatility.

Furthermore, in the above exemplary embodiment, the example is described that includes ON operation hold circuit 5 and OFF operation cutoff control circuit 21, but this is not limited thereto. For example, a configuration may be employed that include any one of ON operation hold control circuit 5 and OFF operation cutoff control circuit 21. This allows simplification of the configuration.

Furthermore, in the above exemplary embodiment, although a provided place is not specifically mentioned, the stroboscopic device may be mounted on a camera, or may be embedded in a mobile phone, a mobile information terminal, etc.

As described above, the present invention provides a stroboscopic device for controlling light emission of a flash discharge tube. The stroboscopic device includes a first element for performing a switching operation of the flash discharge tube, a second element for performing an ON control of the first element by an ON operation, and performing an OFF control of the first element by an OFF operation, a third element for performing the OFF control of the first element by an ON operation, and performing the ON control of the first element by an OFF operation, and a first circuit for holding the ON operation of the third element for a predetermined period. The first circuit includes a fourth element for holding the ON control of the third element by the ON operation, and a second circuit capable of setting an operation period of an ON operation of the fourth element.

According to the configuration, the first element is made to perform the OFF operation by the OFF control of the second element. At this time, against the signal that makes the first element perform the ON operation generated due to noise caused by the OFF operation of the first element, the third element is made to hold the ON operation by the fourth element during the operation period set by the second circuit. Then, the first element is OFF controlled by the ON operation of the third element. Keeping the OFF control of the first element in this manner makes it possible to prevent false operation of the first element. This eliminates the need of a timer circuit and a logic circuit such as an AND gate or an OR gate, which are conventionally needed, as circuits for preventing false operation of the first element. That is, the first circuit can be formed by a simple circuit configuration formed of an ON operation hold transistor and a delay circuit.

The stroboscopic device according to the present invention may further include a third circuit for causing the third element to perform the ON operation based on a light emission control signal for stopping light emission of the flash discharge tube, and the first circuit may further includes a fourth circuit for causing the third element to perform the ON operation by the fourth element regardless of an operation of the third element by the third circuit.

According to the configuration, the fourth circuit makes the ON operation of the third element by the fourth element be performed earlier than the ON operation of the third element by a signal indicating stoppage of light emission from the third circuit. That is, the ON operation of the third element is performed by the signal indicating stoppage of light emission from the third circuit after the ON operation of the third element is performed by the first circuit. This allows the first circuit to keep the ON operation of the third element regardless of affection of noise even when the signal indicating stoppage of light emission from the third circuit is affected by noise. This allows the flash discharge tube to perform stable light emission regardless of noise.

In the stroboscopic device according to the present invention, the fourth circuit may have a first resistor connected between the third circuit and the third element, and a second resistor connected between the third circuit and the second circuit.

According to the configuration, the second resistor turns on the third element by the signal indicating stoppage of light emission from the third circuit. In contrast, the second resistor cutoffs input (current passed through the second resistor) to the third element with respect to the signal indicating start of light emission from the third circuit. That is, the first resistor cutoffs the current from the fourth element not to be drawn in the third circuit, even when the signal indicating stoppage of light emission transmitted from the third circuit is inverted (changed to signal indicating light emission) due to affection of noise. This makes it possible to keep the ON operation of the third element, allowing the flash discharge tube to stably emit light regardless of noise.

In the stroboscopic device according to the present invention, the second circuit may include a first storage element and a third resistor that are branched from a circuit connecting the second element and the fourth element and connected in series, and the fourth element may perform a switching operation by a differential voltage between the first storage element and the third resistor to hold the ON operation of the third element.

According to the configuration, the second circuit is branched from the circuit connecting the second element and the fourth element. Then, the fourth element is made to perform the switching operation during operation period determined by the time constant determined by the first storage element and the second circuit after light emission control signal S is switched from an ON state (light emission state of the flash discharge tube) to an OFF state (light emission stop state of the flash discharge tube). That is, the third element is made to perform the switching operation to hold the ON operation of the third element during the operation period determined by the time constant. This makes it possible to prevent false operation of the first element due to noise during operation period of the fourth element.

INDUSTRIAL APPLICABILITY

The present invention can be applied in a stroboscopic device, which is used with an imaging device such as a digital camera or a mobile phone equipped with camera functions, that has been required to have the function of preventing false operation of a light emission control switching element caused by noise due to switching operation of the light emission control switching element.

REFERENCE MARKS IN THE DRAWINGS

1: flash discharge tube
2: IGBT (first element)
3: ON control transistor (second element)
4: OFF control switching element (third element)
5: ON operation hold control circuit (first circuit)
6, 43: ON operation hold transistor (fourth element)
7: delay circuit (second circuit)
8: signal amplification circuit (third circuit)
9: fourth circuit
10: first resistor
11: second resistor
12: delay capacitor (first storage element)
13: delay resistor (third resistor)
14: power source battery
15: boosting circuit (fifth circuit)
16: main capacitor (second storage element)
17: trigger circuit (sixth circuit)
18: current limiting coil
19: reflux diode
20: external signal input terminal
21: OFF operation cutoff control circuit (seventh circuit)
22: gate power source circuit (eighth circuit)
23: first MOS-FET
24: second MOS-FET
25, 45: resistor
26: fifth resistor
27: sixth resistor
29: seventh resistor
30: pre-stage OFF control transistor (transistor)
31: post-stage OFF control transistor (transistor)
32: OFF operation cutoff transistor
33, 44: differential circuit
34: differential capacitor (third storage element)
35: differential resistor (eighth resistor)
36: ninth resistor
37: tenth resistor
38: gate drive capacitor (fourth storage element)
39: Zener diode
40: eleventh resistor
41: twelfth resistor
42: switching operation control circuit

The invention claimed is:

1. A stroboscopic device for controlling light emission of a flash discharge tube, the stroboscopic device comprising:
   a first element for performing a switching operation of the flash discharge tube;
   a second element for performing an ON control of the first element by an ON operation, and performing an OFF control of the first element by an OFF operation;
   a third element for performing the OFF control of the first element by an ON operation, and performing the ON control of the first element by an OFF operation; and
   a first circuit for holding the ON operation of the third element for a predetermined period,
   wherein the first circuit includes a fourth element for holding the ON operation of the third element by the ON operation, and a second circuit capable of setting an operation period of an ON operation of the fourth element;

a third circuit for causing the third element to perform the ON operation based on a light emission control signal for stopping light emission of the flash discharge tube, the first circuit further includes a fourth circuit for causing the third element to perform the ON operation by the fourth element regardless of an operation of the third element by the third circuit; and wherein the fourth circuit has a first resistor connected between the third circuit and the third element, and a second resistor connected between the third circuit and the second circuit.

2. A stroboscopic device for controlling light emission of a flash discharge tube, the stroboscopic device comprising:

a first element for performing a switching operation of the flash discharge tube;

a second element for performing an ON control of the first element by an ON operation, and performing an OFF control of the first element by an OFF operation;

a third element for performing the OFF control of the first element by an ON operation, and performing the ON control of the first element by an OFF operation; and a first circuit for holding the ON operation of the third element for a predetermined period, wherein the first circuit includes a fourth element for holding the ON control of the third element by the ON operation, and a second circuit capable of setting an operation period of an ON operation of the fourth element;

a third circuit for causing the third element to perform the ON operation based on a light emission control signal for stopping light emission of the flash discharge tube, the first circuit further includes a fourth circuit for causing the third element to perform the ON operation by the fourth element regardless of an operation of the third element by the third circuit;

the fourth circuit has a first resistor connected between the third circuit and the third element, and a second resistor connected between the third circuit and the second circuit;

the second circuit includes a first storage element and a third resistor that are branched from a circuit connecting the second element and the fourth element and connected in series, and the fourth element performs a switching operation by a differential voltage between the first storage element and the third resistor to hold the ON operation of the third element.

\* \* \* \* \*